United States Patent
Huang et al.

(10) Patent No.: US 12,248,637 B2
(45) Date of Patent: *Mar. 11, 2025

(54) METHOD FOR OUTPUTTING COMMAND BY DETECTING OBJECT MOVEMENT AND SYSTEM THEREOF

(71) Applicant: PixArt Imaging Incorporation, Hsin-Chu (TW)

(72) Inventors: Yu-Hao Huang, Hsin-Chu (TW); Yi-Fang Lee, Hsin-Chu (TW); Ming-Tsan Kao, Hsin-Chu (TW); Nien-Tse Chen, Hsin-Chu (TW)

(73) Assignee: PIXART IMAGING INCORPORATION, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,087

(22) Filed: Jun. 28, 2022

(65) Prior Publication Data

US 2022/0326784 A1 Oct. 13, 2022

Related U.S. Application Data

(63) Continuation of application No. 17/244,915, filed on Apr. 29, 2021, now Pat. No. 11,402,922, which is a (Continued)

(30) Foreign Application Priority Data

Apr. 30, 2012 (TW) .................................. 101115305

(51) Int. Cl.
*G06F 3/01* (2006.01)
*G06F 3/00* (2006.01)
(Continued)

(52) U.S. Cl.
CPC .............. *G06F 3/017* (2013.01); *G06F 3/005* (2013.01); *G06F 3/011* (2013.01); *G06F 3/0236* (2013.01);
(Continued)

(58) Field of Classification Search
CPC .... G06F 3/0485; G06F 3/0482; G06F 3/0488; G06F 3/04842; G06F 3/04817; G06F 3/017; G06F 3/0484; G06F 3/04845; G06F 3/0425; G06F 3/005; G06F 3/011; G06F 3/01; G06F 3/014; G06F 3/012;
(Continued)

(56) References Cited

U.S. PATENT DOCUMENTS

| | | | | |
|---|---|---|---|---|
| 7,710,409 B2* | 5/2010 | Robbin | ................. | G06F 1/1626 345/184 |
| 7,907,124 B2* | 3/2011 | Hillis | ..................... | G06F 3/041 345/173 |

(Continued)

*Primary Examiner* — Dismery Mercedes
(74) *Attorney, Agent, or Firm* — Tung & Associates

(57) ABSTRACT

The present invention discloses a method for outputting a command by detecting a movement of an object, which includes the following steps. First, an image capturing device captures images generated by the movement of the object at different timings by. Next, a motion trajectory is calculated according to the plurality of images. Further next, a corresponding command is outputted according to the motion trajectory. The present invention also provides a system which employs the above-mentioned method.

8 Claims, 5 Drawing Sheets

Related U.S. Application Data continuation of application No. 16/702,522, filed on Dec. 3, 2019, now Pat. No. 11,023,052, which is a continuation of application No. 14/715,471, filed on May 18, 2015, now Pat. No. 10,599,224, which is a continuation of application No. 13/865,599, filed on Apr. 18, 2013, now Pat. No. 9,063,585.

(51) Int. Cl.

| | | |
|---|---|---|
| G06F 3/023 | (2006.01) | |
| G06F 3/03 | (2006.01) | |
| G06F 3/042 | (2006.01) | |
| G06F 3/04815 | (2022.01) | |
| G06F 3/0482 | (2013.01) | |
| G06F 3/0484 | (2022.01) | |
| G06F 3/04842 | (2022.01) | |
| G06F 3/0485 | (2022.01) | |
| G06F 3/0488 | (2022.01) | |
| G06F 16/44 | (2019.01) | |
| G06T 7/20 | (2017.01) | |
| G06T 19/00 | (2011.01) | |
| G06V 40/20 | (2022.01) | |
| H04N 21/422 | (2011.01) | |

(52) U.S. Cl.
CPC .......... *G06F 3/0304* (2013.01); *G06F 3/0425* (2013.01); *G06F 3/04815* (2013.01); *G06F 3/0482* (2013.01); *G06F 3/0484* (2013.01); *G06F 3/04842* (2013.01); *G06F 3/0485* (2013.01); *G06F 3/0488* (2013.01); *G06F 16/44* (2019.01); *G06T 7/20* (2013.01); *G06T 19/006* (2013.01); *G06V 40/20* (2022.01); *G06T 2207/30241* (2013.01); *H04N 21/42204* (2013.01)

(58) Field of Classification Search
CPC .............. G06F 3/0304; H04M 1/2747; H04M 1/72469; G06V 40/28; G06V 40/11; G06V 40/20; G06T 2207/30241; G06T 2207/10016; H04N 7/181; H04N 21/42204

See application file for complete search history.

(56) References Cited

U.S. PATENT DOCUMENTS

| | | | | |
|---|---|---|---|---|
| 8,736,557 | B2* | 5/2014 | Chaudhri | G06F 3/0482 345/173 |
| 9,696,808 | B2* | 7/2017 | Nishihara | G06F 3/0304 |
| 2007/0132725 | A1* | 6/2007 | Kitaura | G09G 5/397 340/13.24 |
| 2007/0146337 | A1* | 6/2007 | Ording | G06F 3/0485 345/173 |
| 2007/0271528 | A1* | 11/2007 | Park | H04M 1/72427 715/830 |
| 2008/0062141 | A1* | 3/2008 | Chandhri | G06F 16/444 345/173 |
| 2009/0027337 | A1* | 1/2009 | Hildreth | G06F 3/03 345/158 |
| 2009/0079695 | A1* | 3/2009 | Tatehata | G06F 3/04883 345/168 |
| 2009/0079813 | A1* | 3/2009 | Hildreth | G06F 3/017 348/E7.078 |
| 2010/0079677 | A1* | 4/2010 | Matsubara | G06F 3/0482 348/E5.062 |
| 2010/0162182 | A1* | 6/2010 | Oh | G06F 3/0488 715/863 |
| 2010/0248833 | A1* | 9/2010 | Okamura | A63F 13/57 463/36 |
| 2010/0275159 | A1* | 10/2010 | Matsubara | G06F 3/011 715/810 |
| 2011/0289455 | A1* | 11/2011 | Reville | G06F 3/011 715/830 |
| 2011/0289456 | A1* | 11/2011 | Reville | G06F 3/017 715/830 |
| 2011/0296353 | A1* | 12/2011 | Ahmed | G06F 3/017 715/848 |
| 2011/0310007 | A1* | 12/2011 | Margolis | G06F 3/017 345/157 |
| 2012/0005632 | A1* | 1/2012 | Broyles, III | G06F 3/017 715/863 |
| 2012/0262366 | A1* | 10/2012 | Zhu | G06F 3/0308 345/156 |
| 2015/0011285 | A1* | 1/2015 | Kaiblinger | G07F 17/3209 463/16 |

\* cited by examiner

METHOD FOR OUTPUTTING COMMAND BY DETECTING OBJECT MOVEMENT AND SYSTEM THEREOF

CROSS REFERENCE

The present invention claims priority to TW 101115305, filed on Apr. 30, 2012.

This is a continuation of a co-pending application Ser. No. 17/244,915 filed on Apr. 29, 2021, which is a continuation of application Ser. No. 16/702,522 filed on Dec. 3, 2019, which is a continuation of application Ser. No. 14/715,471 filed on May 18, 2015, which is a continuation of application Ser. No. 13/865,599, filed on Apr. 18, 2013.

BACKGROUND OF THE INVENTION

Field of Invention

The present invention relates to a method and a system for outputting a command; particularly, it relates to such method and system for outputting a command by detecting a movement of a hovering object.

Description of Related Art

Currently, for a user to select a function such as a phone number or a software application program on a smart phone, a handheld device or a display device, the user usually either directly touches the target icon displayed on the touch screen or selects it with an input device. For example, keyboards, mouses or touch panels are typical tools for such selections in desktop PCs or tablet PCs. Alternatively, a user may perform selections in a non-contact manner wherein the device senses gestures of upward, downward, leftward and rightward movements of a user's hand and movement of the user's hand approaching the device screen for selecting a function and confirmation.

Generally, if a user wishes to operate a computer in a non-contact manner to select icons in a menu, the most often used gestures are upward, downward, leftward and rightward movements. However, after a user performs a gesture such as a rightward (leftward) movement, there is a tendency for the user to move his/her hand back to the central position, in particular when the user intends to do another rightward (leftward) movement. Under such circumstance, the device will very likely misinterpret the gesture as a rightward (leftward) movement and perform a corresponding action which is erroneous, such as moving a cursor to an undesired direction and thus causing the user to be unable to select an icon he/she desires.

SUMMARY OF THE INVENTION

The present invention provides a method for outputting a command by detecting a movement of a hovering object, which can efficiently, accurately and easily control an electrical device.

The present invention also provides a system for outputting a command by detecting a movement of an object, which can efficiently, accurately and easily control an electrical device.

The above and other objectives and advantages of the present invention can be understood from the disclosure of the specification.

To achieve the above and other objectives, from one perspective, the present invention provides a method for outputting a command by detecting a movement of a hovering object, the method comprising: capturing a plurality of images generated by the movement of the hovering object at different timings by an image capturing device; calculating a motion trajectory according to the images; and outputting the command according to the motion trajectory, which is sent an electrical device so as to execute a software application program of the electrical device.

In one embodiment, the step of calculating the motion trajectory according to the plurality of images comprises: subtracting a position of gravity center of each of the images by a position of gravity center of a previous image so as to obtain a motion vector at each time interval between the image and the previous image; and calculating the motion trajectory according to the motion vectors.

In one embodiment, the step of calculating the motion trajectory according to the motion vectors comprises: generating object rotation information according to the motion vectors, wherein the object rotation information comprises one or more of a rotation plane normal vector, rotation angle, angular velocity, speed, rotation radius and trajectory length; and outputting the command to execute a software application program of an electrical device according to the object rotation information.

In one embodiment, the step of executing a software application program of an electrical device according to the object rotation information comprises: outputting the command to control a rotation of one or more predetermined angle units according to the rotation plane normal vector and the rotation angle. In one embodiment, the predetermined angle unit is adaptively adjusted according to a trajectory velocity or an angular velocity. In one embodiment, when the hovering object stops rotating, the rotation of one or more predetermined angle units is decelerated according to an average speed or average angular velocity of the object rotation information in a time period before the hovering object stops rotating.

In one embodiment, the step of calculating a motion trajectory according to the plurality of images comprises: detecting a change of shape, size, light intensity or position of the hovering object in the images to determine whether the motion trajectory is a horizontal motion trajectory or a vertical motion trajectory.

From another perspective, the present invention provides a system for outputting a command by detecting a movement of a hovering object, the system comprising: an image capturing device for capturing a plurality of images generated by the hovering object of the object at different timings; and a processing unit for receiving the plurality of images and calculating a motion trajectory according to the plurality of images and outputting the command according to the motion trajectory, which is sent an electrical device so as to execute a software application program of the electrical device.

In one embodiment, the system further comprises: an invisible light source for illuminating the hovering object, wherein the image capturing device is for detecting light emitted from the invisible light source.

In one embodiment, the hovering object includes a part of a hand of a user.

In view of the above, the method and system according to the present invention for outputting the command by detecting the hovering object of the object is capable of operating a menu (such as scrolling and selecting) by a rotation gesture along a plane. For example, the menu is shifted rightward by two units when the user's hand rotates clockwise by 360 degrees two times; the menu is shifted leftward by one unit when the user's hand rotates counterclockwise by 360 degrees one time. Thus, the user can input commands by sequential gestures in a space which are unlikely to be misinterprets. Besides, the input of the command by rotation gestures is more efficient, more accurate and easier than the conventional method by upward, downward, leftward and rightward movements. Furthermore, the rotation of the hovering object is preferably detected by calculating the difference among the motion vectors (e.g., the rotation angle), which is simpler and more effective with respect to the calculation and implementation, as compared to the conventional approach which needs to define a center of rotation from multiple positions of the hovering object.

The objectives, technical details, features, and effects of the present invention will be better understood with regard to the detailed description of the embodiments below, with reference to the drawing.

DESCRIPTION OF THE PREFERRED EMBODIMENTS

Figure 1:
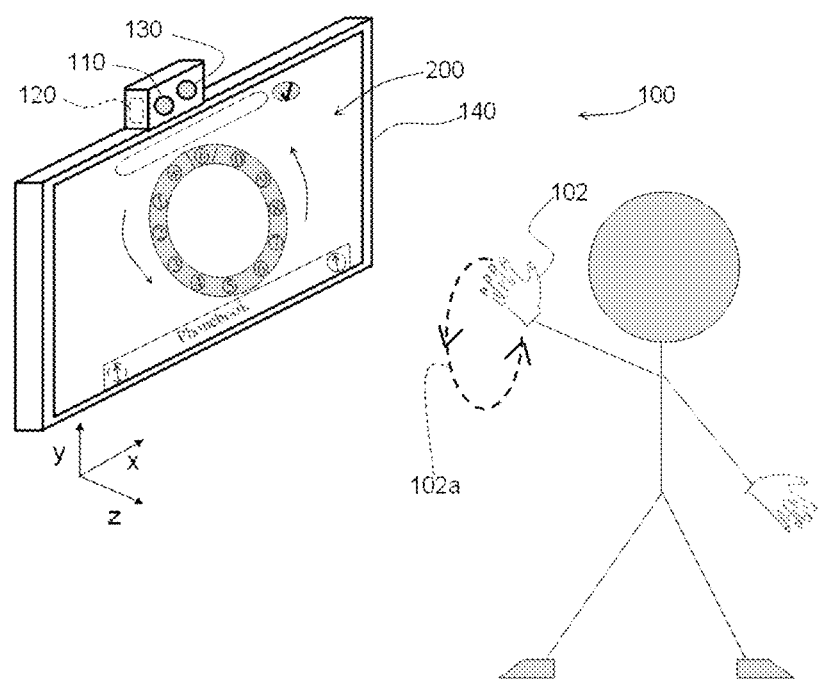
FIG. 1 is a schematic view showing a system for outputting a command by detecting a movement of a hovering object according to an embodiment of the present invention.

The above and other technical details, features and effects of the invention will be will be better understood with regard to the detailed description of the embodiments below, with reference to the drawings. In the description, the words relate to directions such as "up", "down", "left", "right", "forward", "backward", etc. are used to illustrate relative orientations in the drawings and should not be considered as limiting in any way.

FIG. 1 is a schematic view showing a system for outputting a command by detecting a movement of an hovering object according to an embodiment of the present invention. Referring to FIG. 1, the system 100 of this embodiment comprises an image capturing device 110 and a processing unit 120. The image capturing device 110 is capable of capturing images generated by the movement of an hovering object 102 at different timings. The image sensor 110 can be a charge coupled device (CCD), a complementary metal oxide semiconductor (CMOS) image sensor, or any other device capable of detecting light intensity. In this embodiment, an infrared light source 130 is used for illuminating the hovering object 102, and therefore the image sensor 110 is an infrared image sensor. Certainly, the above-mentioned infrared light source and infrared image sensor are for illustrative purpose, but not for limiting the scope of the present invention; a user can use any other light source and image sensor. In this embodiment of FIG. 1, the hovering object 102 is for example but not limited to a hand or a part of a hand 102 of the user. The hovering object 102 can also be a user with a handheld device or any other part of the user.

Still referring to FIG. 1, the processing unit 120 is capable of receiving the images captured by the image sensor 110 which are generated by the movement of the user's hand 102, and calculating the motion trajectory 102a according to the images. Next, the processing unit 120 outputs a command which is sent to an electrical device 140 (e.g., the display device of FIG. 1) according to the motion trajectory 102a so as to perform a function such as executing a software application program of the electrical device 140. (As illustrated later, examples of the function include, but not limited to, dialing a number on the phonebook by a dialer wheel, or scrolling, selection and control of the phonebook)

Figure 2A:
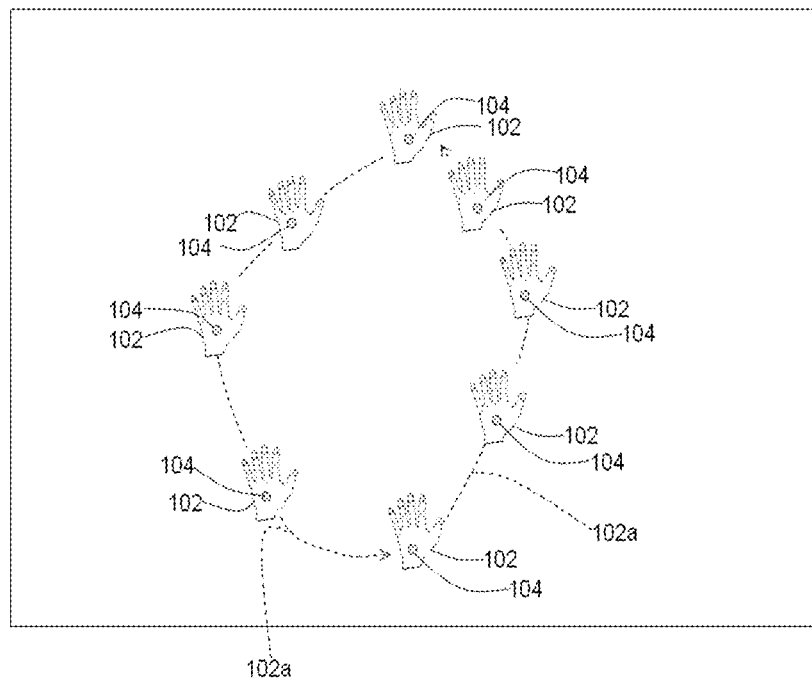
FIG. 2A shows a schematic view of eight images generated by the movements of a user's hand 102 at different timings.
Figure 2B:
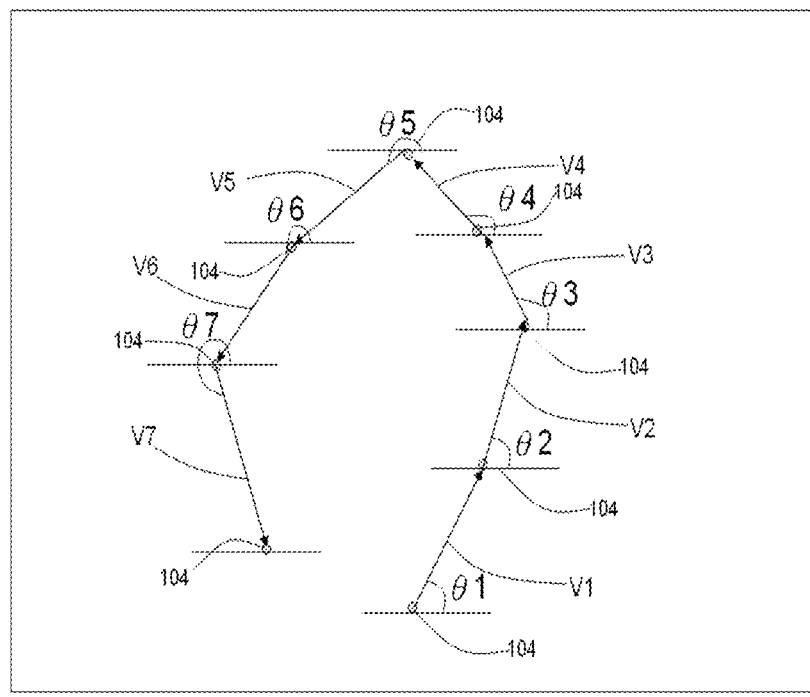
FIG. 2B is a schematic view showing the positions of gravity centers of the hovering object of FIG. 2A at different timings and the motion vectors corresponding to the movements of the positions of gravity centers of the hovering object.

According to this embodiment, the method for outputting a command by detecting a movement of the hovering object 102 comprises the following steps. First, as shown in FIG. 2A, the image capturing device 110 captures the images generated by the movement of the user's hand 102 at different timings. For the sake of better illustration, FIG. 2A shows eight images generated by the movement of user's hand 102 at different timings in one figure. Next, as shown in FIG. 2B which is a schematic view showing the positions of gravity centers of the hovering objects of FIG. 2A at different timings and the motion vectors corresponding to the movements of the positions of gravity centers of the hovering objects), the gravity center 104 of the second image is subtracted by the gravity center 104 of the first image to obtain a motion vector V1, and likely for each image to be subtracted by a previous image, so that motion vectors V1-V7 are obtained. Next, the motion trajectory 102a of the user's hand 102 is calculated and obtained from the motion vectors V1-V7. In this embodiment, the gravity center 104 of the hovering object 102 can be calculated for example according to the coordinates and light intensities of the pixels in the captured images.

As shown in FIG. 2B, the angles θ1-θ7 between the motion vectors V1-V7 and the horizontal plane are different at different timings. If the images are captured at a fixed frequency, which is usually the case, the angle change at each unit time can be obtained. As such, the motion trajectory 102a can also be calculated according to such angle change. Alternatively, the motion trajectory 102a can be calculated directly according to the motion vectors V1-V7. Thus, this embodiment is able to detect an object rotation according to the motion vectors V1-V7 and generate corresponding object rotation information, wherein the object rotation information for example can include one or more of a rotation plane normal vector, rotation angle, angular velocity, speed, rotation radius and trajectory length. Such object rotation information can be used to perform a function such as executing a software application program of the electrical device 140.

Figure 3A:
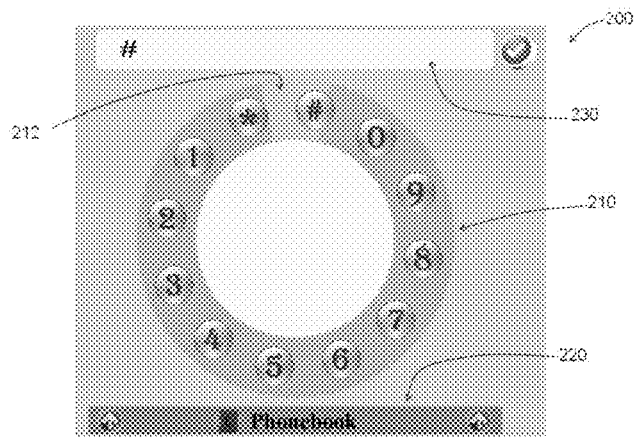
FIGS. 3A-3C are schematic views showing that an application software is performed by the object rotation.
Figure 3C:
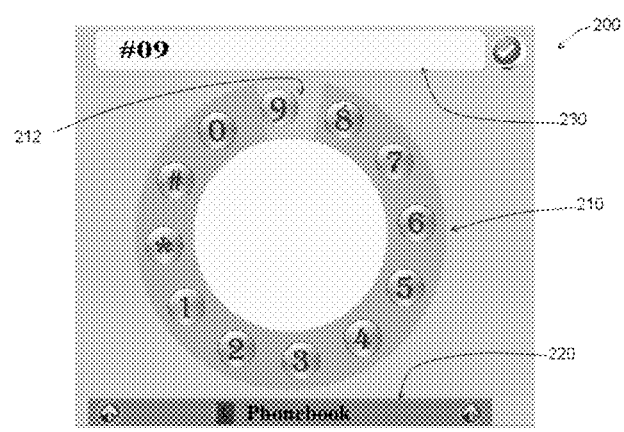
Figure 3B:
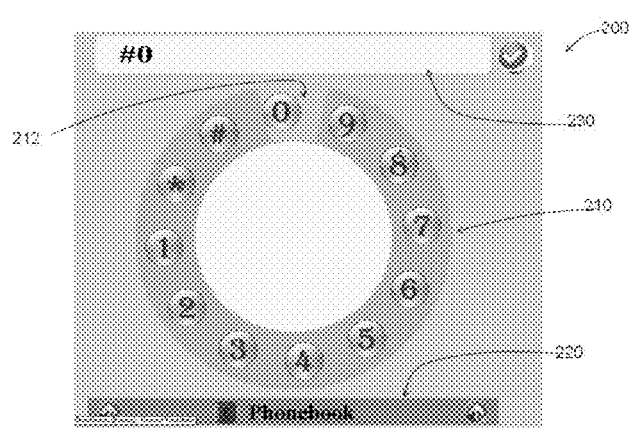

FIGS. 3A-3C illustrates an example as to how a software application program of the electrical device 140 is performed according to the object rotation information.

Referring to FIG. 3A, a telephone dialer program 200 of the electrical device 140 displays a dialing wheel 210 and a phonebook 220 on a screen of the electrical device 140. The dialing wheel 210 is operated according to the object rotation information. More specifically, to effectively control the rotation speed of the dialing wheel 210, preferably, the system 100 outputs the command to control the rotation of the dialing wheel 210 by one or more predetermined angle units, for example according to the rotation plane normal vector and the rotation angle which are generated by the user's hand 102. For example, a command of one right-turn unit is outputted when the user's hand 102 rotates clockwise (the normal direction is −Z) by 180 degrees along the XY plane; a command of two left-turn units are outputted when the user's hand 102 rotates counterclockwise (the normal direction is +Z) by 360 degrees along the XY plane. Hence, referring to the process shown in FIGS. 3A-3C, when the user rotates his/her hand 102 counterclockwise by 180 degrees, the dialing wheel 210 is rotated by one unit. The number or symbol falling in a selection area 212 is outputted to a ready-to-dial telephone number region 213. After the user finishes inputting all digits of the telephone number, the user can move his/her hand near to the image capturing device 110 to dial the desired telephone number. Although the position of the hovering object in the image is not changed, the shape, size or light intensity of the hovering object in the image is changed. Therefore, the processing unit 120 can recognize the user's intention and output a command to dial the desired telephone number. In this embodiment, the user can also rotate his/her hand 102 clockwise for reverse rotation.

In a preferable embodiment, to control the dialing wheel 210 more smoothly for better user feeling, the above-mentioned predetermined angle unit can be adaptively adjusted according to the trajectory velocity or the angular velocity. For example, when the user rotates his/her hand 102 relatively faster, the predetermined angle unit is set relatively smaller (e.g., a command of four units is outputted when the user's hand 102 rotates 360 degrees). On the contrary, when the user rotates his/her hand 102 relatively slower, the predetermined angle unit is set relatively larger (e.g., a command of one unit is outputted when the user's hand 102 rotates 360 degrees). Likewise, when the user's hand 102 stops rotating, the rotation by predetermined angle units can be decelerated according to the average speed or average angular velocity in a time period before the user's hand 102 stops rotating. In this way, the system 100 can continue outputting the angle (or the command) with an inertia for a time period after the user's hand 102 stops rotating. The above-mentioned time period for example can be determined by the relationship between the average speed (average angular velocity) and the deceleration (angular deceleration).

Figure 4:
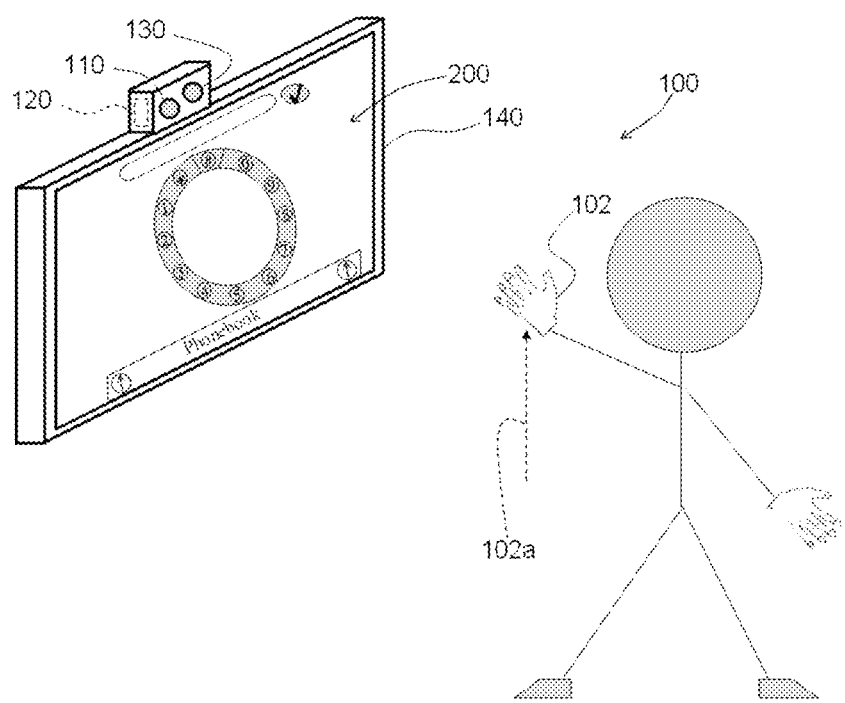
FIG. 4 shows that the hand of the user in FIG. 1 is moving in a vertical direction.
Figures 5A, 5B, 5C:
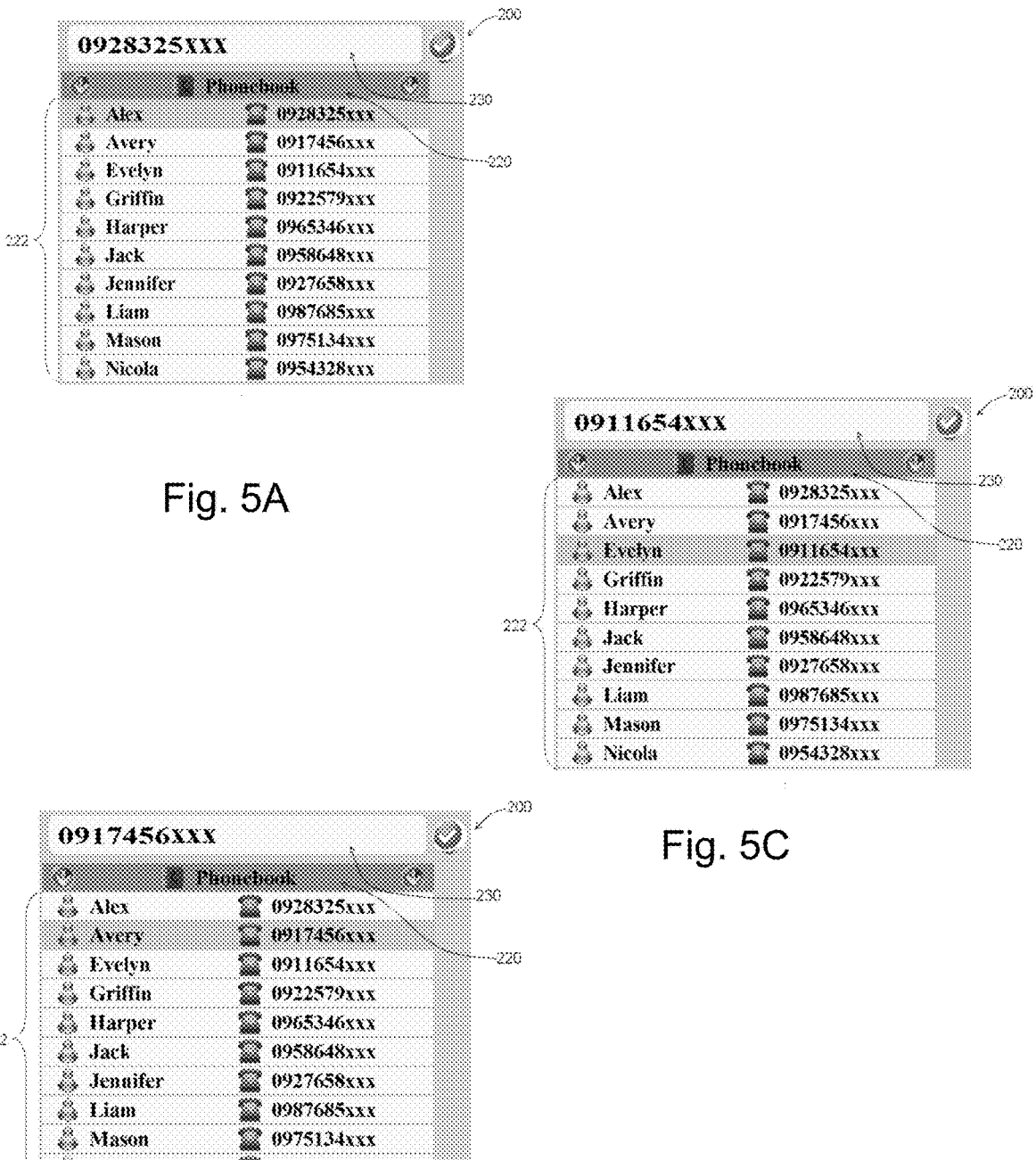
FIG. 5A shows that the vertical movement of the user's hand opens a phonebook menu.
FIGS. 5B-5C are schematic views showing that the user can operate (scroll) the phonebook menu by object rotation.

FIG. 4 shows that the hand of the user of FIG. 1 moves in vertical direction. FIG. 5A shows that a phonebook menu is opened after the hand of the user moves in vertical direction as shown in FIG. 4. Please refer to FIG. 1, FIG. 4, and FIG. 5A. The dialing wheel 210 of the telephone dialer program 200 can be operated by rotating the user's hand 102, but if the user desires to directly select the information stored in the phonebook 220, he/she may move his/her hand 102 along the vertical direction such that the phonebook list 222 is pulled out (as shown in FIG. 5A). In other words, the phonebook list 222 can be pulled out by detecting the movement of the hovering object 102 (the user's hand 102) along the vertical direction.

Next, after the phonebook list 222 is opened, the user can rotate his/her hand 102, and the system 100 can detect the rotation gesture to scroll the list and select a phone number, as shown in FIG. 5B and FIG. 5C. Similar to the above, the user can move his/her hand near to the image capturing device 110 to dial the desired telephone number. Although the position of the hovering object in the image is not changed, the shape, size or light intensity of the hovering object in the image is changed. The processing unit 120 can recognize the user's intention and output a command to dial the desired telephone number.

In view of the above, the present provides a method and a system for outputting the command by detecting the movement of the hovering object, which have at least the following advantages. First, a menu can be operated by a rotation gesture of a hand along a plane. For example, the menu is shifted rightward by two units when the user's hand rotates clockwise by 360 degrees two times; the menu is shifted leftward by one unit when the user's hand rotates counterclockwise by 360 degrees one time. Thus, the user can input commands by sequential gestures in a space which are unlikely to be misinterprets. Besides, the input of the command by rotation gestures is more efficient, more accurate and easier than the conventional method by upward, downward, leftward and rightward movements. Furthermore, the rotation of the hovering object is preferably detected by calculating the difference among the motion vectors (e.g., the rotation angle), which is simpler and more effective with respect to the calculation and implementation, as compared to the conventional approach which needs to define a center of rotation from multiple positions of the hovering object.

The present invention has been described in considerable detail with reference to certain preferred embodiments thereof. It should be understood that the description is for illustrative purpose, not for limiting the scope of the present invention. For example, the motion vector can be calculated by means other than by the positions of gravity centers of the hovering objects, such as by other representative points of the hovering objects. An embodiment or a claim of the present invention does not need to achieve all the objectives or advantages of the present invention. The title and abstract are provided for assisting searches but not for limiting the scope of the present invention. In view of the foregoing, the spirit of the present invention should cover all such and other modifications and variations, which should be interpreted to fall within the scope of the following claims and their equivalents.

What is claimed is:

1. A method for outputting one or more commands by detecting a movement of a hovering object, the method comprising:
  capturing a plurality of images generated by the movement of the hovering object by an image capturing device;
  calculating a motion trajectory according to the images by an image processor, wherein the motion trajectory includes a rotation, and the rotation is analyzed to generate a number of predetermined angle units; and
  outputting the one or more commands according to the motion trajectory to control an action of an electronic device;
  wherein the motion trajectory includes a vertical movement which is detected to trigger the action, wherein the triggered action includes pulling out a phonebook list to show the phonebook list on a screen;
  wherein the step of calculating the motion trajectory according to the plurality of images comprises:
  subtracting a position of gravity center of the hovering object in each of the images by a position of gravity center of the hovering object in a previous image so as to obtain a motion vector corresponding to each image; and
  calculating the motion trajectory according to the motion vectors;

wherein the step of calculating the motion trajectory according to the motion vectors comprises:

generating object rotation information according to the motion vectors, wherein the object rotation information comprises one or more of a rotation plane normal vector, rotation angle, angular velocity, speed, rotation radius and trajectory length; and outputting the command to execute a software application program of an electrical device according to the object rotation information;

wherein the step of outputting the command according to the object rotation information comprises:

outputting the command to control a rotation of one or more predetermined angle units according to the rotation plane normal vector and the rotation angle.

2. The method of claim 1, wherein the predetermined angle unit is adaptively adjusted according to a trajectory velocity or an angular velocity.

3. The method of claim 1, further comprising: illuminating the hovering object with an invisible light source, wherein the image capturing device is for detecting light emitted from the invisible light source.

4. The method of claim 1, wherein the step of calculating a motion trajectory according to the plurality of images comprises:

detecting a change of shape, size, light intensity or position of the hovering object in the images to determine whether the motion trajectory is a horizontal motion trajectory or a vertical motion trajectory.

5. The method of claim 1, wherein the object includes a part of a hand of a user.

6. The method of claim 1, wherein when the movement of the hovering object stops, the action is decelerated according to a function of a speed of the hovering object in a time period before the hovering object stops moving.

7. The method of claim 1, further including: after pulling out the phonebook list to show the phonebook list on the screen, scrolling the phonebook list by the rotation movement.

8. A method for outputting one or more commands by detecting a movement of a hovering object, the method comprising:

capturing a plurality of images generated by the movement of the hovering object by an image capturing device;

calculating a motion trajectory according to the images by an image processor, wherein the motion trajectory includes a rotation, and the rotation is analyzed to generate a number of predetermined angle units; and outputting the one or more commands according to the motion trajectory to control an action of an electronic device;

wherein the motion trajectory includes a specific directional movement which is detected to trigger the action, wherein the triggered action includes pulling out a phonebook list to show the phonebook list on a screen;

wherein the step of calculating the motion trajectory according to the plurality of images comprises:

subtracting a position of gravity center of the hovering object in each of the images by a position of gravity center of the hovering object in a previous image so as to obtain a motion vector corresponding to each image; and calculating the motion trajectory according to the motion vectors;

wherein the step of calculating the motion trajectory according to the motion vectors comprises:

generating object rotation information according to the motion vectors, wherein the object rotation information comprises one or more of a rotation plane normal vector, rotation angle, angular velocity, speed, rotation radius and trajectory length; and outputting the command to execute a software application program of an electrical device according to the object rotation information;

wherein the step of outputting the command according to the object rotation information comprises:

outputting the command to control a rotation of one or more predetermined angle units according to the rotation plane normal vector and the rotation angle.

* * * * *